US008255492B2

(12) United States Patent
Zhu et al.

(10) Patent No.: US 8,255,492 B2
(45) Date of Patent: Aug. 28, 2012

(54) DYNAMIC CONTENT PLAY CONTROL

(75) Inventors: Lejun Zhu, Shanghai (CN); Yuman Zhang, Shanghai (CN); Kecheng Lu, Beijing (CN)

(73) Assignee: Intel Corporation, Santa Clara, CA (US)

( * ) Notice: Subject to any disclaimer, the term of this patent is extended or adjusted under 35 U.S.C. 154(b) by 102 days.

(21) Appl. No.: 12/376,778

(22) PCT Filed: Aug. 9, 2006

(86) PCT No.: PCT/CN2006/002015

§ 371 (c)(1), (2), (4) Date: May 25, 2010

(87) PCT Pub. No.: WO2008/019530

PCT Pub. Date: Feb. 21, 2008

(65) Prior Publication Data

US 2010/0293244 A1 Nov. 18, 2010

(51) Int. Cl.
*G06F 15/16* (2006.01)

(52) U.S. Cl. ........................................ 709/219; 709/217

(58) Field of Classification Search ........................ None
See application file for complete search history.

(56) References Cited

U.S. PATENT DOCUMENTS 6,567,979 B1 * 5/2003 deCarmo ........................ 725/25
2002/0059588 A1 * 5/2002 Huber et al. .................... 725/35
2002/0156744 A1 * 10/2002 Senoh et al. ................... 705/59
2003/0028622 A1 2/2003 Inoue et al.
2004/0049395 A1 * 3/2004 Gaya ................................ 705/1
2010/0293244 A1 * 11/2010 Zhu .............................. 709/217

FOREIGN PATENT DOCUMENTS

| | | | |
|---|---|---|---|
| CN | 1787631 | A | 6/2006 |
| CN | 1791215 | A | 6/2006 |
| EP | 1530115 | A2 | 5/2005 |
| EP | 1670204 | A2 | 6/2006 |
| WO | 2004059942 | A1 | 7/2004 |
| WO | WO-2008-019530 | | 2/2008 |

OTHER PUBLICATIONS

Berners-Lee, Tim, A Unifying Syntax for the Expression of Names and Addresses of Objects on the Network as used in the World-Wide Web, Universal Resource Identifiers in WWW, Mar. 12, 1994, 78 pages, Switzerland.
Intel Corporation, Extended Device Remote Transfer Protocol (XRT Protocol), Feb. 2005, 30 pages, Version 2.2, Intel Corporation.

(Continued)

*Primary Examiner* — David England
(74) *Attorney, Agent, or Firm* — Barnes & Thornburg, LLP

(57) ABSTRACT

Machine-readable media, methods, and apparatus are described for dynamic content play control. In some embodiments, a client device (11) may receive a mark associated with a content piece from a remote system (10) connecting with the client device (11) through a network. The client device (11) may determine whether to play the content piece by checking the mark with a policy table comprising a plurality of marks. The policy table may indicate whether each of a plurality of content pieces associated with each of the plurality of marks is acceptable for play.

20 Claims, 6 Drawing Sheets

OTHER PUBLICATIONS

Knowlson, Ken et al., The Digital Home: A Low-Cost, Wireless, Plug and Play Solution, Intel DeveloperUPDATEMagazine, Nov. 2002, 6 pages, Intel Corporation.
Wischy, Markus, UPnP Remote UI, UPnP Forum, 15 pages.
Zhang, Yiliang, PCT/CN2006/002015 International Search Report, May 17, 2007, 2 pages, The State Intellectual Property Office, the P.R. China, Beijing, China.
Zhang, Yiliang, PCT/CN2006/002015 Written Opinion of the International Searching Authority, Apr. 17, 2007, 4 pages, The State Intellectual Property Office, the P.R. China, Beijing, China.
Moyse, Ellen, PCT/CN2006/002015 International Preliminary Report on Patentability, Feb. 10, 2009, 5 pages, The International Bureau of WIPO, Geneva, Switzerland.
First Office Action, Chinese Patent Application No. 200680055251.3, May 6, 2010, 16 pages.
Extended European Search Report received for European App. No. 0.6775333.5-2212, mailed Nov. 21, 2011, 5 pages.
Official Communication received for European App. No. 0.6775333.5-2212, mailed Dec. 8, 2011, 1 page.

* cited by examiner

DYNAMIC CONTENT PLAY CONTROL

CROSS REFERENCE TO RELATED APPLICATION

This patent application is a U.S. National Phase application under 35 U.S.C. §371 of International Application No. PCT/CN2006/002015, filed on Aug. 9, 2006, entitled DYNAMIC CONTENT PLAY CONTROL.

BACKGROUND

During client interactive sessions, an application running on a remote system may send content, such as movies, news service, or games, to a client device through a network. The client device may decode the content so that a play unit coupled to the client device may play the content for the client. Before playing an individual piece of the content, the application may send a warning message to the client device, so that the application may query the client for a play acceptance or a play rejection.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes techniques for dynamic content play control. In the following description, numerous specific details such as logic implementations, pseudo-code, means to specify operands, resource partitioning/sharing/duplication implementations, types and interrelationships of system components, and logic partitioning/integration choices are set forth in order to provide a more thorough understanding of the current invention. However, the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a non-transitory, machine-readable medium that may be read and executed by one or more processors. A non-transitory, machine-readable medium may include any mechanism for storing information in a form readable by a machine (e.g., a computing device). For example, a non-transitory machine-readable medium may include read only memory (ROM); random access memory (RAM); magnetic disk storage media; optical storage media; flash memory devices; and others.

Figure 1:
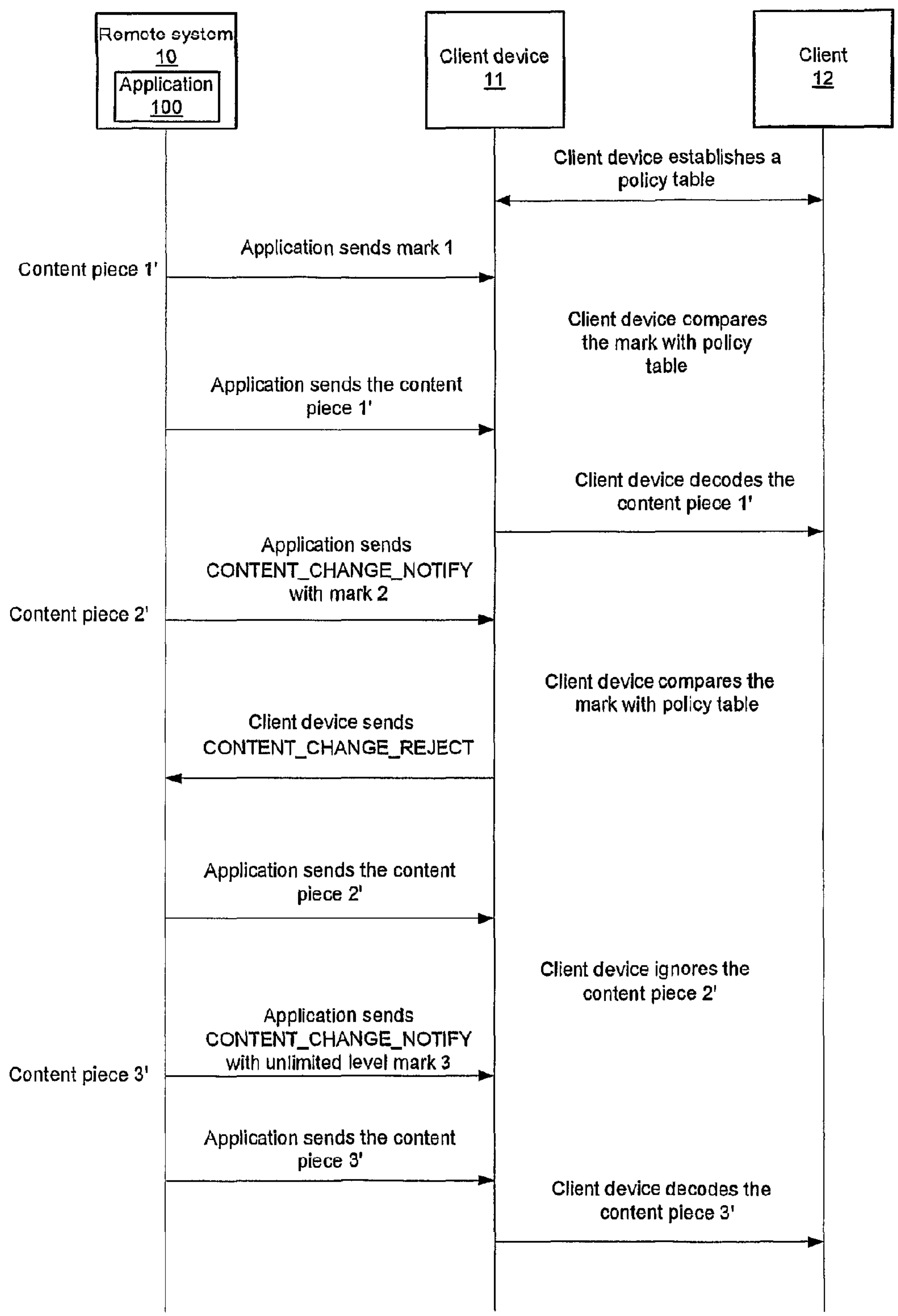
FIG. 1 shows an embodiment of a session between a remote system and a client device for content play.

FIG. 1 shows an embodiment of a session between a remote system 10 and a client device 11, in which content may be delivered to the client device 11.

As shown, an application 100 running on the remote system 10 may provide content to the client device 11 through a network, such as Ethernet, fiber channel, wireless connection and possibly other communication links. Examples of the application 100 may comprise a remote user interface (UI) application. Examples of the remote system 10 may comprise mainframe computer, mini-computer, personal computer, portable computer, laptop computer and other devices for transceiving and processing data.

Each individual piece of the content provided by the application 100 may be associated with an identifying mark. The mark may identify the content based upon content piece name, content piece provider, and/or content piece category. The content piece category may be diverse. For example, the content piece category may comprise game, movie, and news. For another example, the content piece category may comprise educational content piece, adult content piece, and horrible content piece. For yet another example, the content piece category may comprise content piece for free and general audience only and content piece for payment and adult audience only. Examples of the mark may comprise a unified resource identifier (URI) used to identify the content piece based upon various standards, such as standards set by the Motion Picture Association Of America (MPAA).

The client device 11 may determine whether to play the content piece for the client 12 based upon a policy table stored in the client device 11. Examples of the client device 11 may comprise a content processing device coupled to a play unit (e.g., a set-top box coupled to a television), a content processing and playing device including the play unit (e.g., a handheld/mobile media device), and possibly other devices for transceiving and processing data.

The policy table may comprise a plurality of marks in various types. For example, the policy table may comprise acceptable marks (i.e., the marks associated with the content pieces acceptable for play) and unacceptable marks (i.e., the marks associated with the content pieces unacceptable for play). For another example, the policy table may only comprise the acceptable marks, and default any marks different from the acceptable marks as unacceptable marks, or vice versa.

The policy table may be established in various ways. In an embodiment, the client device 11 may run its own application to interact with the client 12 to establish the policy table. For example, the client device 11 may display various marks associated with various content pieces on a user interface so that the client may choose what kinds of content pieces to play. In another example, the client device 11 may pre-store various policy tables suitable for various circumstances, such as a policy table for the circumstance that the play unit is placed in a children's room and a policy table for the circumstance that the play unit is placed in a parent's room, so that the client may select a policy table by indicating a specific circumstance.

However, other embodiments may implement other technologies on establishing the policy table. For example, the policy table may be provided by a manufacturer when manufacturing the client device. The policy table may also be established by another remote application connecting with the client device through the network and downloading the policy table to the client device when required.

At the beginning of the session between the application 100 and the client device 11, the application 100 may send a mark 1 associated with a content piece 1' to the client device 11. The client device 11 may check the mark 1 with the policy table and determine to play the content piece if the mark 1 belongs to one of the acceptable marks according to the policy table. Then, the client device 11 may decode and play the content piece 1' for the client 12.

When the application 100 is ready to send different content piece, it may send a CONTENT_CHANGE_NOTIFY command to the client device 11 to notify that another content piece 2' may be provided. Meanwhile, the application 100 may send a mark 2 associated with the content piece 2' to the client device 11. The client device 11 may check the mark 2 with the policy table and reject the content piece 2' if the mark 2 belongs to the unacceptable marks according to the policy table. The client device 11 may send a CONTENT_CHANGE_REJECT command the application 100 to notify the play rejection decision for the content piece 2'.

In response to the play rejection decision, the client device 11 may ignore the content piece 2'. Alternatively, the application 100 may generate a content piece 3' associated with an unlimited level mark 3 and send the unlimited level mark 3 as well as the content piece 3' to the client device 11. The unlimited level mark may be a must accept mark indicating that the client device 11 must accept to play its associated content piece without checking the mark with the policy table.

The unlimited level mark may be a globally unique mark recognizable by all of the client devices applying the present invention. Examples for the content piece 3' may comprise a technical warning message for the rejected content piece 2', a technical report for the application, and a menu to prompt the client 12 to interact with the application or the client device. Then, the client device 11 may decode and display the content piece 3' received from the application 100.

Other embodiments may implement other technologies for the session as described as above. In an embodiment, the application 100 may not provide the content piece 3', but continue sending content pieces and associated marks. Then, the client device 11 may need to check the marks with the policy table in order to determine whether to play the associated content pieces. Alternatively, the application 100 may send a previous content piece associated with a previous mark that has been accepted to play by the client device 11.

In another embodiment, the application 100 may provide the special content piece associated with the unlimited level mark under other circumstances than in response to receiving the play rejection command. For example, the application 100 may provide the special content piece at the beginning of the session with the client device, and the special content piece may comprise a menu to prompt the client 12 to interact with the application 100 or the client device 11. For another example, the application 100 may provide the special content piece in response to receiving an unknown mark command from the client device 11 indicating that the client device 11 can not recognize the mark sent from the application 100. The special content piece may comprise a description of the mark so that the client 12 may determine whether to play the content piece associated with the unknown mark.

In yet another embodiment, the content provider and the mark provider may be different. For example, two applications may run on one remote system connecting with the client device 11 via the network to respectively provide the content piece and the mark associated with the content piece. For another example, two remote systems connecting with the client device 11 via the network may respectively provide the content pieces and the marks associated with the content piece.

Figure 2:
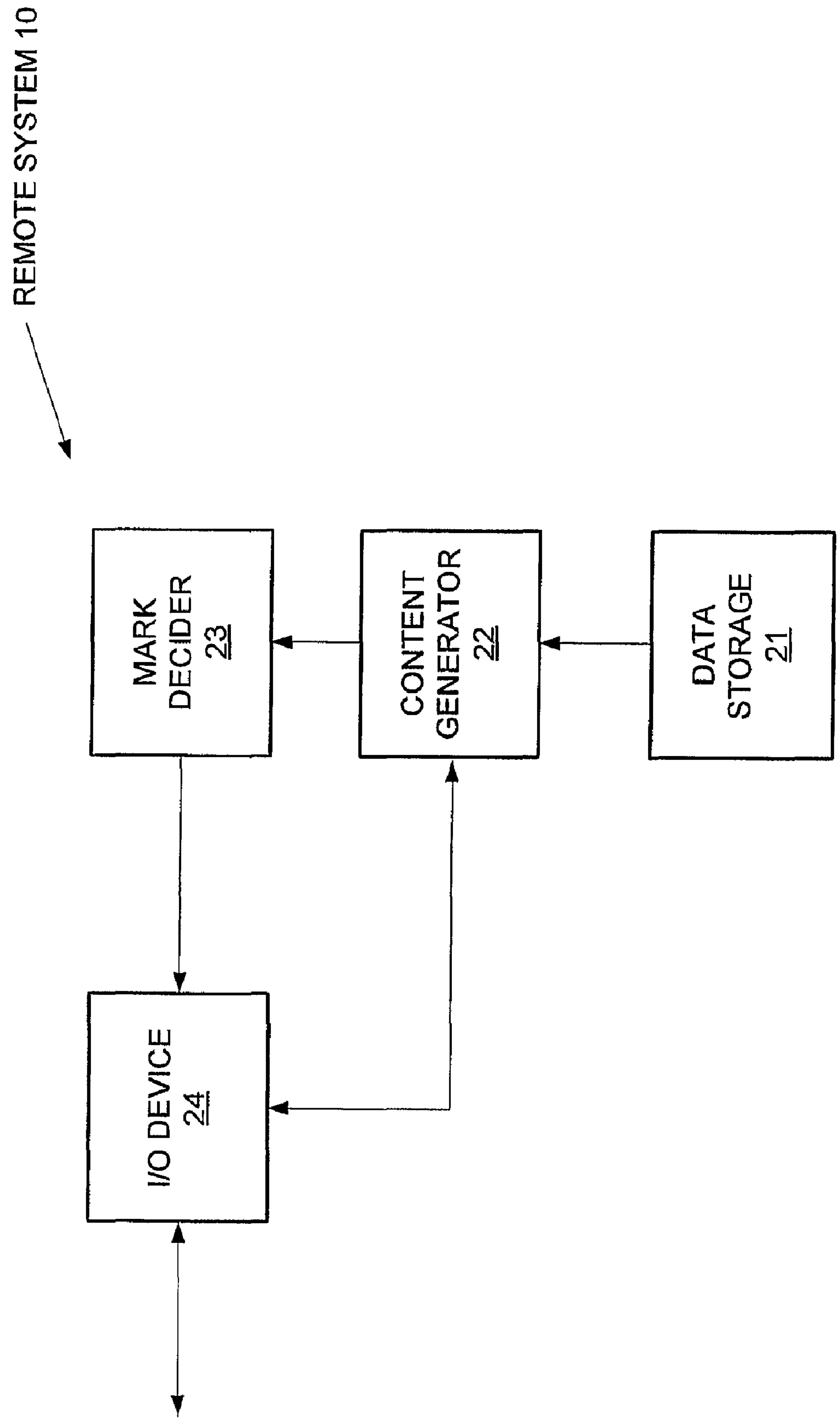
FIG. 2 shows an embodiment of a logical structure of the remote system.

FIG. 2 shows an embodiment of a logical structure of the remote system 10. As shown, the remote system 10 may comprise a data storage 21, a content generator 22, a mark decider 23, and an I/O device 24. The data storage 21 may store data used to generate the content to be provided to the client device 11. The content generator 22 may generate the content based upon the data in the data storage 21 before or during the session with the client device 11. The mark decider 23 may decide a mark associated with each individual piece of the content from the content generator 22 based upon various factors, such as mark descriptions and content piece characteristics (e.g., content piece name, content piece provider, or content piece categories).

The I/O device 24 may receive from or send data to the client device 11 through the network. For example, the I/O device 24 may send the marks from the mark decider 23 and the content pieces from the content generator 22 to the client device 11 through the network. For another example, the I/O device 24 may receive a play rejection command from the client device 11 through the network, which may trigger the content generator 22 to generate a specific content piece and the mark decider 23 to decide an unlimited level mark associated with the special content piece, so that the I/O device 24 may send the unlimited level mark and the special content piece to the client device 11.

Other embodiments may implement other technologies for the structure of the remote system 10. In an embodiment, the content generator 22 may be omitted if the content pieces are pre-stored in the data storage 21 or provided by any other parties rather than the remote system 10. In another embodiment, the I/O device 24 may send the mark first and then send the content piece to the client device 11 after receiving a play acceptance command indicating that the client device 11 may accept to play the content piece by checking the mark with the policy table. In yet another embodiment, the I/O device 24 may not send the content piece to the client device 11 after receiving the play rejection command indicating that the client device 11 may reject to play the content piece by checking the mark with the policy table.

Figure 3:
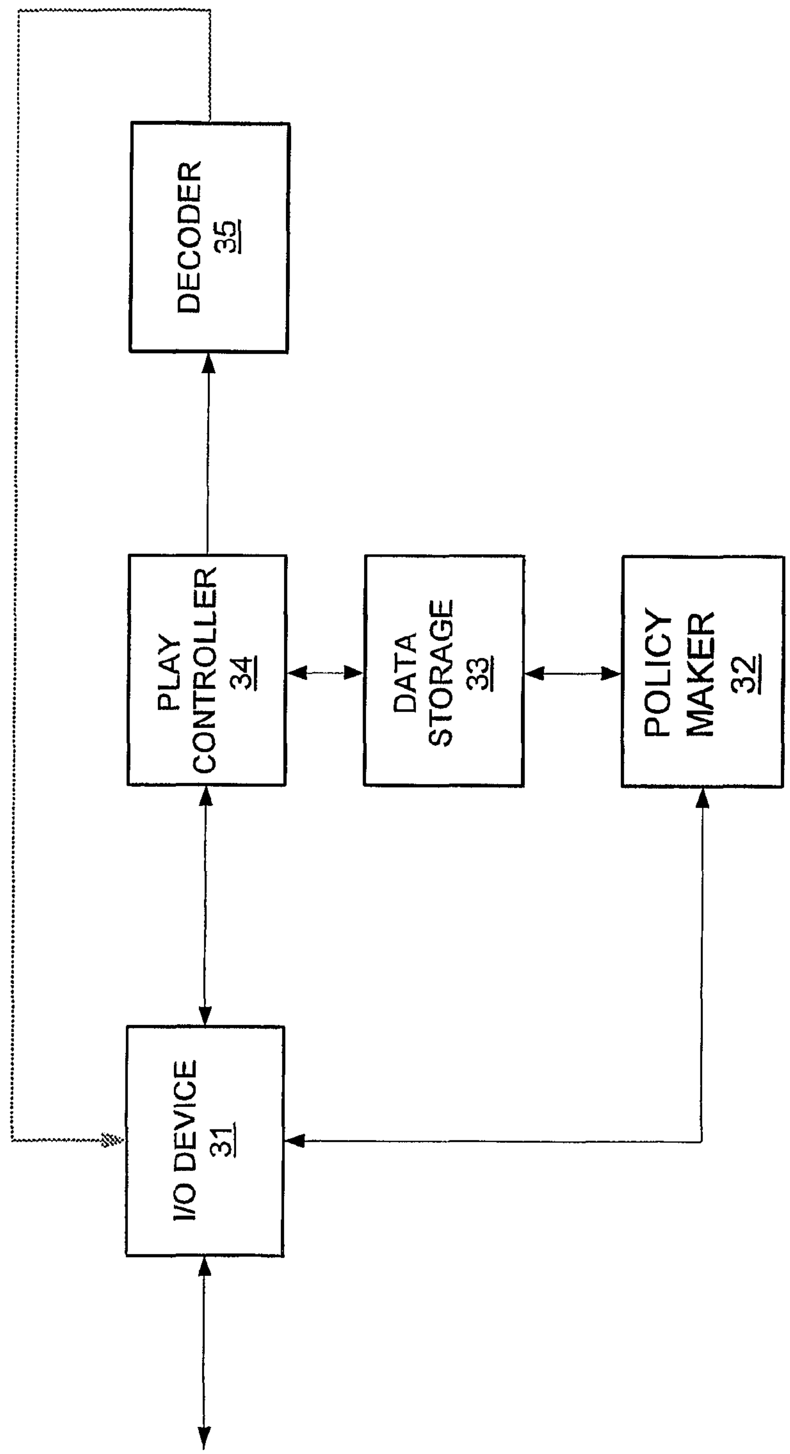
FIG. 3 shows an embodiment of a logical structure of the client device.

FIG. 3 shows an embodiment of a logical structure of the client device 11. As shown, the client device 11 may comprise an I/O device 31, a policy maker 32, a data storage 33, a play controller 34, and a decoder 35. The I/O device 31 may receive from or send data to the application 100 through the network.

The policy maker 32 may run a local application on the client device to interact with the client 12 and establish the policy table comprising the plurality of marks based upon opinions from the client 12. As described above, various methods may be adopted to establish the policy table and may not be reiterated here for simplicity.

The data storage 33 may store the policy table established by the policy maker 32. However, as stated above, the policy table may be established by the manufacturer or another remote application connecting with the client device 11 through the network. In such a case, the policy maker 32 may be omitted and the data storage 33 may store the policy table downloaded directly from the manufacturer or another remote application.

The play controller 34 may determine whether to play the content piece associated with the mark received from the application 100 by checking the mark with the policy table stored in the data storage 33. In response to determining to play the content piece, the play controller 34 may pass the content piece received from the application 100 to the decoder 35. In response to determining not to play the content piece, the play controller 34 may send a play rejection command to the application 100 and ignore the content piece. If the application 100 sends the unlimited level mark and its associated content piece after receiving the play rejection command, the play controller 34 may determine to play the content piece directly, e.g., without checking the unlimited level mark with the policy table.

The decoder 35 may be responsible for decoding the content passed from the play controller 34 so that the play unit may play the content.

Other embodiments may implement other technologies for the structure of the client device 11. In an embodiment, the policy maker 32 may be further responsible for updating the policy table, which may be trigger by the client 12, the client device 11, the application 100, or other parties. For example, the client 12 may trigger the policy maker 32 to update the policy table by pressing a button. During updating the policy table, the client device 11 may suspend the session with the application 100 by storing the data from the application 100 in the data storage, so that the client device 11 may continue to process the data after the session is restored. However, update of the policy table may be done by the manufacturer or possibly other parties instead of the client device 11.

Figure 4:
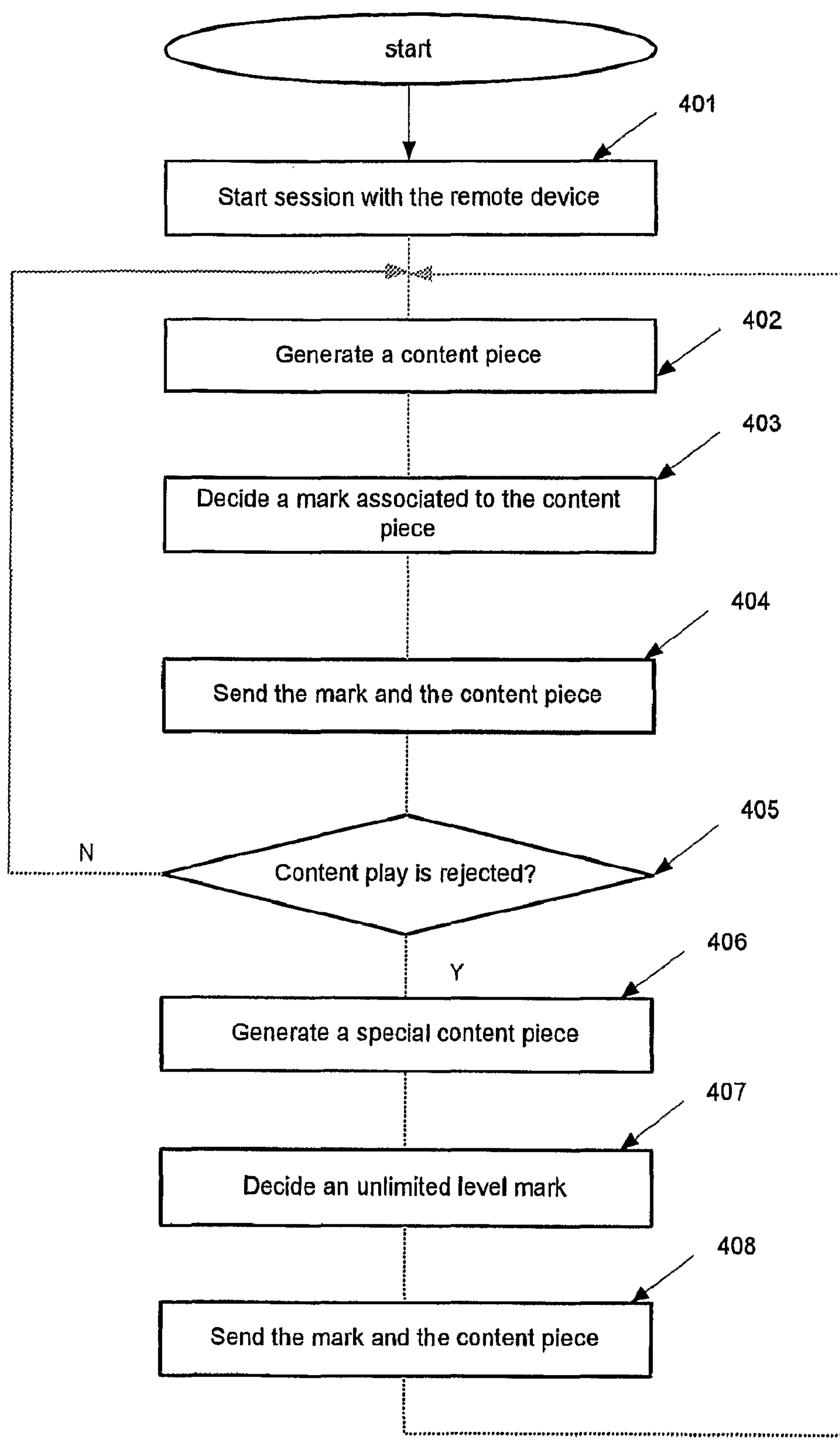
FIG. 4 shows an embodiment of a method of content provision by the remote system.

FIG. 4 shows an embodiment of a method of providing content to the client device 11 by the application 100 running on the remote system 10.

In block 401, the application 100 may start a session with the client device 11 through the network. In block 402, the content generator 22 of the application 100 may generate a content piece based upon the data stored in the storage 21. However, it should be appreciated that other technologies may be adopted for generating the content piece. For example, the content generator 22 may generate the content piece before the session. For another example, the content piece may be pre-stored in the remote system 10 or be provided by any other parties rather than the remote system 10. In block 403, the mark decider 23 may decide a mark associated with the content piece based upon various factors, such as mark descriptions and content piece characteristics (e.g., content piece names, content piece provider, and content piece categories).

In block 404, the I/O device 24 of the remote system 10 may send the mark determined in block 403 to the client device 11, and then send the content piece generated in block 402 to the client device 11. However, it should be appreciated that other technologies may be adopted for sending the content piece. For example, the remote system 10 may send the content piece when the client device 11 confirms to play the content piece. For another example, the mark and its associated content piece may be sent in other orders or at the same time.

In block 405, it is determined whether the client device 11 rejects to play the content piece. Many methods may be applied for block 405. For example, the determination of block 405 may be made depending on whether the I/O device 24 of the remote system 10 receives a play rejection command indicating that the client device 11 may reject to play the content piece.

In response to determining that the client device 11 accepts to play the content piece, the method of FIG. 4 may go back to block 402 and continue generating a next content piece. However, in response to determining that the client device 11 may reject to play the content piece, the content generator 22 may generate a special content piece that the client device 11 must accept to play, in block 406. Accordingly, in block 407, the mark decider 23 may decide an unlimited level mark for the special content piece that may trigger the client device 11 to decode and/or play the content piece directly. In block 408, the I/O device 24 may send the unlimited level mark and its associated content in any order to the client device 11.

Other embodiments may implement other technologies for providing the content by the application 100. For example, the application 100 may not provide the special content piece with the unlimited level mark when being notified that the client device 11 rejects to play the content piece generated in block 402. Therefore, blocks 406-408 of FIG. 4 may be omitted. In such case, the application 100 may continue to generate and send a next content piece to the client device 11 or send a previous content piece that has been accepted by the client device 11.

Figure 5:
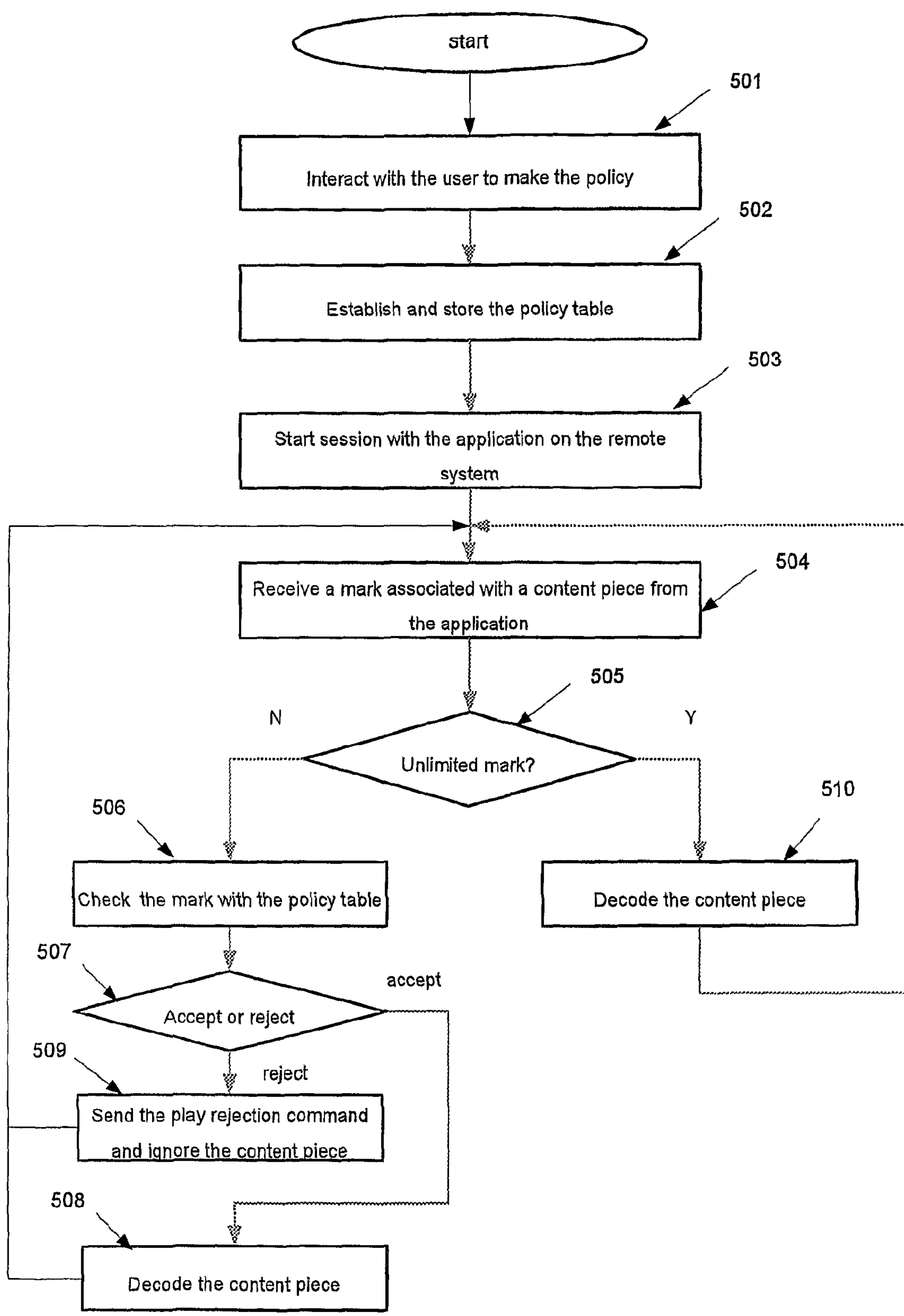
FIG. 5 shows an embodiment of a method of content play control by the client device.

FIG. 5 shows an embodiment of a method of controlling the content play by the client device 11. In block 501, the policy maker 32 of the client device 11 may run a local application to interact with the client 12 and collect inputs from the client 12 for policy making. In block 502, the policy maker 32 may establish the policy table based upon the inputs from the client 12 and store the policy table in the data storage 33. The policy table may comprise the plurality of marks in various types. As stated above, the policy table may be established in other ways. For example, the policy table may be downloaded from any parties other than the client device 11. In such case, blocks 501 and 502 may be omitted.

In block 503, the client device 11 may start the session with the application 100 running on the remote system 10. In block 504, the I/O device 31 of the client device 11 may receive a mark associated with a content piece from the application 100. Then, the play controller 34 of the client device 11 may decide whether the mark is the unlimited level mark, which indicates that the play controller 34 may accept to play the associated content piece directly, for example, without checking the unlimited level mark with the policy table.

If the mark received in block 504 is not the unlimited level mark, the play controller 34 may check the mark with the plurality of marks in the policy table to determine whether or not to play the content piece associated with the mark in block 507. In response to accepting to play the content piece, the play controller 34 may pass the content piece to the decoder 35 for decoding in block 508, so that the play unit coupled to the client device may play the content piece. However, in response to rejecting to play the content piece in block 507, the I/O device 31 of the client device 11 may send a play rejection command to the application 100 and ignore the content piece in block 509.

If, in block 505, it is determined that the mark received in block 504 is an unlimited level mark, the play controller 34 may pass the associated content piece directly to the decoder 35 for decoding in block 510. As stated above, the content piece associated with the unlimited level mark may comprise various information, such as the technical warning message for the rejected content piece, the technical report for the application 100, or the menu to prompt the client 12 to interact with the client device 11.

Other embodiments may implement other technologies on the method of content play control by the client device 11. In an embodiment, the policy maker 32 may further update the policy table if being triggered by any parties, such as the client 12, the client device 11, or the application 100. In such case, the policy maker 32 may suspend the session with the application 100 when updating the policy table and restore the session after completing the update.

Figure 6:
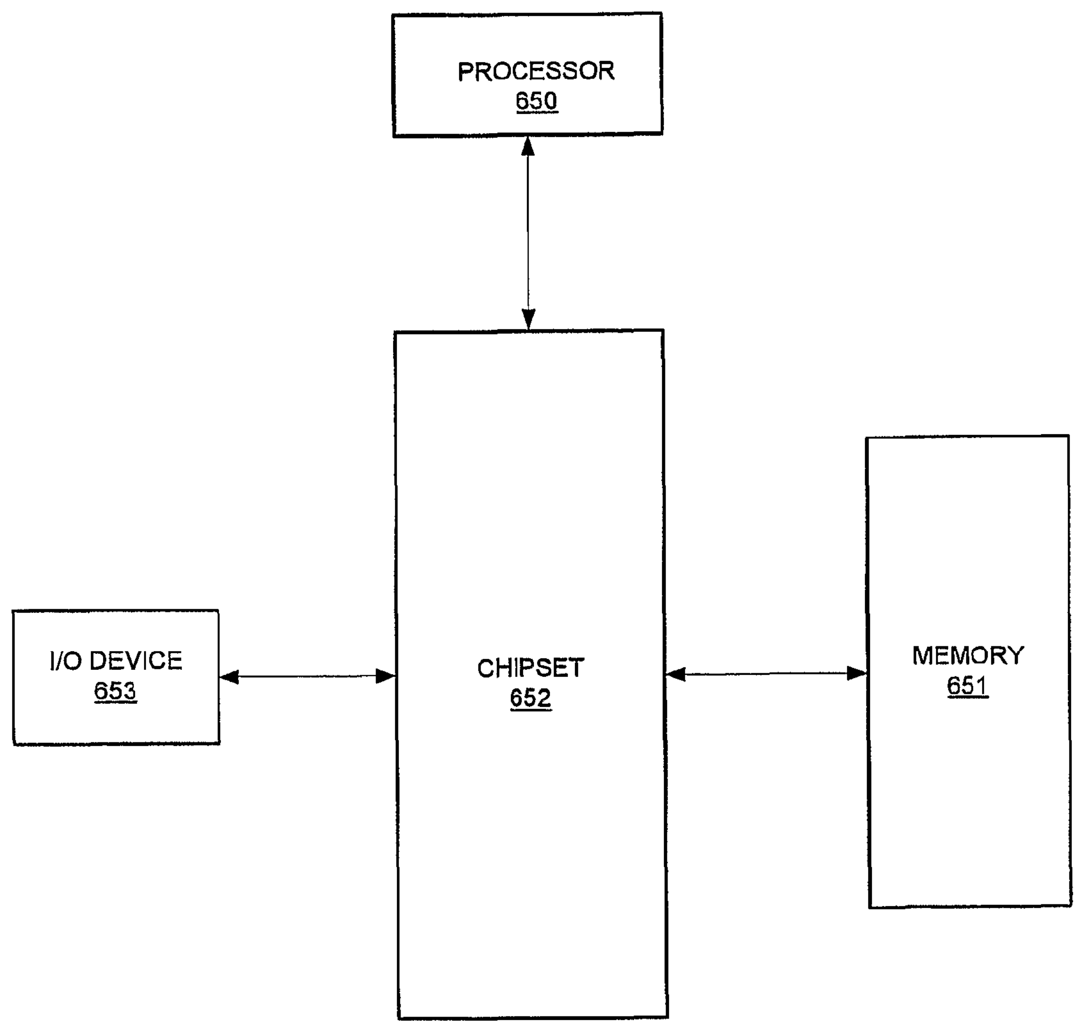
FIG. 6 shows an embodiment of a computing platform that may be implemented as the remote system or the client device.

FIG. 6 depicts an embodiment of a general computing platform that may be implemented as the remote system 10 or the client device 11. The computing platform may comprise one or more processors 650, memory 651, chipset 652, I/O device 653 and possibly other components. The one or more processors 650 are communicatively coupled to various components (e.g., the memory 651) via one or more buses such as a processor bus. The processors 650 may be implemented as an integrated circuit (IC) with one or more processing cores that may execute codes. For the remote system 10, examples of the processor 650 may include Intel® Pentium™, Intel® Itanium™, Intel® Core™2 Duo architectures, available from Intel Corporation of Santa Clara, Calif. For the client device 11, examples of the processor 650 may include Intel® Pentium-M™ architecture.

In an embodiment, the memory 651 may store codes to be executed by the processor 650. Examples of the memory 651 may comprise one or a combination of the following semiconductor devices, such as synchronous dynamic random access memory (SDRAM) devices, RAMBUS dynamic random access memory (RDRAM) devices, double data rate (DDR) memory devices, static random access memory (SRAM), and flash memory devices. For the remote system 10, the memory 651 may store codes to be implemented as the data 21, content generator 22 and mark decider 23. For the client device 11, the memory 651 may store codes to be implemented as the policy maker 32, the policy table 33 and the play controller 34.

In an embodiment, the chipset 652 may provide one or more communicative path among the processor 650, memory 651 and various components, such as the I/O device 653. Examples of the I/O devices 653 may comprise a keyboard, mouse, network card, a storage device, a camera, a blue-tooth, an antenna, and the like.

Other embodiments may implement other technologies for the structure of the computing platform as shown in FIG. 6. For example, if the computing platform is implemented as the client device 11, the computing platform may further comprise a decoder to decode content or the processor 650 may be installed with the decoding instructions to decode the contents. Further, the I/O device may further comprise a play unit (e.g., a video device and an audio device) to play the contents. For another example, if the computing platform is implemented as the remote system 10, the computing platform may further comprise a BIOS firmware having routines or drivers that the computing platform may execute to communicate with one or more components of the computing platform.

While certain features of the invention have been described with reference to example embodiments, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method of a client device, comprising:

receiving, with the client device, a mark associated with a content piece from a remote system connecting with the client device through a network;

checking, on the client device, the mark with a policy table to determine whether to play the content piece, wherein the policy table includes a plurality of marks and indicates whether each of a plurality of content pieces associated with each of the plurality of marks is acceptable for play;

receiving, with the client device, another content piece associated with another mark from the remote system, after the client device rejects to play the content piece;

determining, on the client device, whether the another mark is a must-accept mark, the must-accept mark is a globally unique mark recognizable by the client device and indicates that the client device must accept to play the another content piece without checking the another mark with the policy table; and decoding, on the client device, the another content piece if the another mark is the must-accept mark.

2. The method of claim 1, further comprising determining, on the client device, to play the content piece if the mark matches one of the plurality of marks whose associated content piece is acceptable for play according to the policy table.

3. The method of claim 1, further comprising rejecting, with the client device, to play the content piece if the mark matches one of the plurality of marks whose associated content piece is unacceptable for play according to the policy table.

4. The method of claim 1, further comprising generating, on the client device, the policy table based upon interactions with a client.

5. The method of claim 1, further comprising storing the policy table in the client device.

6. The method of claim 1, further comprising updating, with the client device, the policy table based upon interactions with a client.

7. The method of claim 1, further comprising:

receiving, with the client device, the content piece from the remote system; and decoding, on the client device, the content piece in response to determining to play the content piece.

8. A client device, comprising:

a storage unit to store a policy table comprising a plurality of marks;

an I/O device to receive a mark associated with a content piece from a remote system connecting with the client device through a network;

a play controller to check the mark with the policy table to determine whether to play the content piece, wherein the policy table indicates whether each of a plurality of content pieces associated with each of the plurality of marks is acceptable for play; and wherein the I/O device further to receive another content piece associated with a must-accept mark from the remote system after the client device rejects to play the content piece, the must-accept mark is a globally unique mark recognizable by the client device and indicates that the client device must accept to play the another content piece without checking the mark must-accept mark with the policy table.

9. The client device of claim 8, wherein the play controller further to determine to play the content piece if the mark matches one of the plurality of marks whose associated content piece is acceptable for play according to the policy table.

10. The client device of claim 8, wherein the play controller further to reject to play the content piece if the mark matches one of the plurality of marks whose associated content piece is unacceptable for play according to the policy table.

11. The client device of claim 8, further comprising a decoder to decode the content piece if the play controller determines to play the content piece.

12. The client device of claim 11, further comprising a play unit to play the decoded content piece from the decoder.

13. The client device of claim 8, further comprising a policy maker to generate the policy table based upon interactions with a client.

14. The client device of claim 8, further comprising a policy maker to update the policy table based upon interactions with a client.

15. The client device of claim 8, wherein the I/O device further to send a play rejection notification to the remote system if the play controller rejects to play the content piece.

16. A non-transitory, machine-readable medium comprising a plurality of instructions which when executed result in a remote system:

generating a mark associated with a content piece for a client device, connecting with the remote system through a network, to determine whether to play the content piece by checking the mark with a policy table, wherein the policy table includes a plurality of marks and indicates whether each of a plurality of content pieces associated with each of the plurality of marks is acceptable for play;

sending the mark to the client device through the network;

generating another content piece associated with a must-accept mark in response to the client device determining not to play the content piece, the must-accept mark is a globally unique mark recognizable by the client device and indicates that the client device must accept to play the another content piece without checking the mark must-accept mark with the policy table; and sending the must-accept mark and the another content piece to the client device through the network.

17. The non-transitory, machine-readable medium of claim 16, wherein the plurality of instructions further result in the remote system:

sending the content piece to the client device through the network.

18. A remote system, comprising:

a mark decider to decide a mark associated with a content piece for a client device, connecting with the remote system through a network, to determine whether to play the content piece by checking the mark with a policy table, wherein the policy table includes a plurality of marks and indicates whether each of a plurality of content pieces associated with each of the plurality of marks is acceptable for play;

an I/O device to send the mark to the client device through the network; and a content generator to generate another content piece associated with a must-accept mark in response to the client device determining not to play the content piece, the must-accept mark is a globally unique mark recognizable by the client device and indicates that the client device must accept to play the another content piece without checking the must-accept mark with the policy table.

19. The remote system of claim 18, wherein the content generator further to generate the content piece.

20. The remote system of claim 18, wherein the I/O device further to send the content piece to the client device through the network.

* * * * *